J. E. EMERSON.
SAW.
No. 174,216. Patented Feb. 29, 1876.
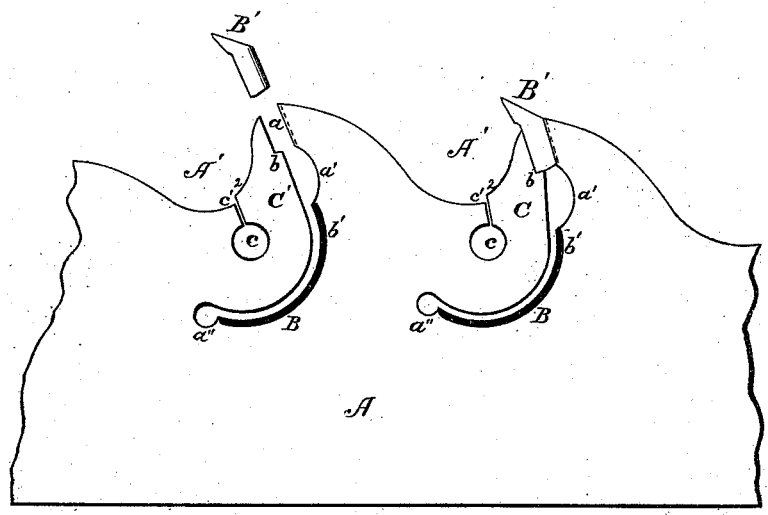

UNITED STATES PATENT OFFICE.

JAMES E. EMERSON, OF BEAVER FALLS, PENNSYLVANIA.

IMPROVEMENT IN SAWS.

Specification forming part of Letters Patent No. 174,216, dated February 29, 1876; application filed February 12, 1876.

*To all whom it may concern:*

Be it known that I, JAMES E. EMERSON, of Beaver Falls, in the county of Beaver, in the State of Pennsylvania, have made certain Improvements in Saws, of which the following is a specification:

The object of this invention is to improve that kind of saws for sawing wood that have insertable or removable cutting-teeth, in such way that the blade or plate may be thinner, and if a circular saw, can be much smaller in diameter as well as thinner in blade; and it consists in the peculiar construction of the plate or blade, as that the cutting-teeth will be securely held in their place by spring-holders and throat-pieces forming a part of the blade itself, as will be hereinafter fully described.

In the drawing, A represents the saw-blade or section of a saw. B represents a circular slit from the periphery or edge of the saw-blade, at $a$, to receive the tooth or cutter, and ending in a circular hole, $a''$, in the blade, which would prevent any liability of cracking the plate by any hard strain upon it by reason of there being no acute angle at which a crack or break could commence. $a'$ represents an enlarged opening in the slit B to admit a key or wrench, by which the opening $a$, at the edge of the saw, can be opened to admit the tooth B′. C is the spring-holder and throat-piece, and forming the wall or one side of the slit B, and is a part of the saw-blade itself. $c$ is a circular or round hole through the saw-blade, and centrally located as to the circular part of slit B. $c'$ is a narrow slit from the throat-opening or dust-spaces forward of the tooth into the round hole $c$, and is for the purpose of allowing the throat-piece and spring-holder C to be sprung, so that the two sides of slit $c'$ will meet and allow the opening $a$ to be enlarged and receive the tooth B′, and when the tooth is inserted the spring throat-piece C springs back upon the tooth and holds it firmly in its place.

The teeth B′ are formed similarly to teeth now in use in other patents granted to me, and are prevented from lateral movement by an angular or round ridge formed on their backs to fit into V or curved-shaped grooves in the saw-blade. The opening at $a$ will be a trifle less in width than the thickness of the tooth, or as much less as will be necessary to have the spring in the holder grasp the tooth and hold it securely in place when the tooth is inserted.

$b$ is a shoulder in the spring throat-piece to stop the tooth against and prevent it from being forced further inward, and as all the teeth are of exactly the same length, and the recesses $a$ all cut to have the abutting shoulder $b$ concentric with the axial center of the saw, all the teeth will project the same distance from the center. The throat-piece C, from point 1, at opening $a$, to point 2, at the slit $c'$, is friction-surface hardened, so as to prevent wear by the constant action of the chips cut by the teeth striking thereon.

The circular slit B has its sides at $b'$ beveled to be angular, so that gum or pitch will not hold dust thereto and fill up the slit. Hole $c$ and slit $c'$ may also be beveled back for the same purpose.

A saw-blade thus formed to receive insertable teeth has no parts to become loose, as it is a part of the blade itself, and when so formed and tempered the teeth will be held firmly and securely in place by the spring-holder, and enables a saw-maker to insert and hold the teeth in smaller and thinner saws than by other methods in use.

A saw thus formed can be successfully used in resawing where the thickness of the saw is important, and teeth can be securely held in reciprocating-saws cutting in one direction, as well as in circular saws.

Having thus described my invention, what I claim is—

A saw, the blade of which has the recess $a$, slit B, hole $c$, slit $c'$, and spring-holder C′ for each tooth B′, substantially as and for the purposes described.

JAMES E. EMERSON.

Witnesses:
A. G. MCCREARY,
J. MASON GOSZLER.